(12) United States Patent
Zhang et al.

(10) Patent No.: US 10,230,604 B2
(45) Date of Patent: Mar. 12, 2019

(54) SYSTEM AND METHOD TO MONITOR NETWORK DELAY

(71) Applicant: AirMagnet, Inc., Santa Clara, CA (US)

(72) Inventors: Yu Zhang, Beijing (CN); Dong Wang, Beijing (CN); Guangzhi Zhang, Beijing (CN); Tengjiao Sun, Beijing (CN); Kent Laver, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 61 days.

(21) Appl. No.: 15/444,884

(22) Filed: Feb. 28, 2017

(65) Prior Publication Data

US 2017/0250884 A1    Aug. 31, 2017

Related U.S. Application Data

(60) Provisional application No. 62/301,311, filed on Feb. 29, 2016.

(51) Int. Cl.
*H04L 12/26* (2006.01)
*H04L 12/24* (2006.01)
*H04L 12/807* (2013.01)

(52) U.S. Cl.
CPC ...... *H04L 43/0852* (2013.01); *H04L 41/0681* (2013.01); *H04L 43/024* (2013.01);
(Continued)

(58) Field of Classification Search
CPC . H04L 43/0852; H04L 43/16; H04L 41/0681; H04L 43/024; H04L 47/27; H04L 43/0858
See application file for complete search history.

(56) References Cited

U.S. PATENT DOCUMENTS 8,194,539 B2 *  6/2012  Jakobsen ............ H04L 43/0847
                                                                370/230
9,614,689 B2 *  4/2017  Cook .................. H04L 43/0847
(Continued)

FOREIGN PATENT DOCUMENTS

EP    1206085 A2    5/2002
EP    1689121 A1    8/2006

OTHER PUBLICATIONS

Extended European Search Report for European Patent Application No. 17158547.4, dated Jun. 28, 2017.

*Primary Examiner* — Min Jung
(74) *Attorney, Agent, or Firm* — Locke Lord LLP; Scott D. Wofsy; Christopher J. Capelli

(57) ABSTRACT

A method of monitoring a network is provided that includes receiving a stream of samples having respective network delay values; defining at least one first group of samples having a size defined by a window size; determining respective first network delay characteristics for the first groups based on the network delay values corresponding to the respective samples included in the corresponding group; applying a first test to the first network delay characteristic determined for the respective first groups; adjusting the window size based on a result of the first test associated with the respective first groups; using the adjusted window size, define respective second groups of samples having samples of the stream of samples subsequent to the samples included in the at least one first group; determining a second network delay characteristic for the respective second groups; applying a second test to the second network delay characteristics; and determining whether to generate an alert notification based on a result of at least one of the first and second tests.

13 Claims, 6 Drawing Sheets

(52) U.S. Cl.
CPC .......... *H04L 43/0858* (2013.01); *H04L 43/16* (2013.01); *H04L 47/27* (2013.01); *H04L 41/06* (2013.01)

(56) References Cited

U.S. PATENT DOCUMENTS

| | | | |
|---|---|---|---|
| 2005/0075842 A1* | 4/2005 | Ormazabal | H04L 63/02 |
| | | | 702/188 |
| 2013/0301435 A1* | 11/2013 | Panah | H04W 4/90 |
| | | | 370/252 |
| 2014/0269303 A1 | 9/2014 | Toy | |
| 2016/0360454 A1* | 12/2016 | Soldati | H04W 48/12 |

* cited by examiner

SYSTEM AND METHOD TO MONITOR NETWORK DELAY

CROSS REFERENCE TO RELATED APPLICATIONS

This application claims priority to U.S. Patent Application Ser. No. 62/301,311 filed Feb. 29, 2016 which is incorporated herein by reference in its entirety.

FIELD OF THE INVENTION

The present technology relates to methods and systems to monitor a network and, more particularly, methods and systems to monitor network delay time.

BACKGROUND OF THE INVENTION

Network delay is the amount of time it takes for a bit of data to travel across a network from one node to another. Since large network delays can affect customer experience, network delay is frequently monitored. Results of monitoring network delays are provided to maintenance staff for analysis and remedial action. Alerts can be generated when network delay becomes unacceptable or exceed a predetermined threshold. However, network delay can fluctuate quickly such that an alert can be issued due to a short occurrence of increased network delays. However, many short-lived network delays are fleeting and can be ignored. For example, a delay caused by a data burst in which a large amount of data passed quickly through a network can short-lived. Recovery may occur without intervention and ensuing alerts may not be needed. Alarm generation for such short-lived network delays can be disruptive and can habituate users to ignoring alarms.

One solution used by conventional systems for avoiding issuance of alerts for short-lived network delays is to group samples of network delay measurements into groups and compare the average network delay of each group to a threshold. However instantaneity can be compromised by such groupings. Loss of instantaneity can cause alert generation to be postponed and negatively affect the user-experience.

Such conventional methods and systems have generally been considered satisfactory for their intended purpose. However, there is still a need in the art for monitoring of network delays that provides both improved instantaneity and improved accuracy. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in accordance with one aspect of the disclosure a network monitoring system is provided that includes at least one processing device configured to perform operations including receiving a stream of samples, wherein each sample has an associated network delay value that indicates an amount of time data packets associated with the sample are delayed when transmitted between first network device and second network devices coupled to a network. The operations further include defining at least one first group of samples, wherein the number of samples included in each group are defined by a window size, and determining a first network delay characteristic for the respective first groups, wherein each network delay characteristic is based on the network delay values corresponding to the respective samples included in the corresponding group.

The operations further include applying a first test to the first network delay characteristic determined for the respective first groups, adjusting the window size based on a result of the first test associated with the respective first groups, and using the adjusted window size, define at least one second group of samples, each second group including samples of the stream of samples subsequent to the samples included in the at least one first group. The operations further include determining a second network delay characteristic for the respective second groups, applying a second test to the second network delay characteristic determined for the respective second groups, and determining whether to generate an alert notification based on a result of at least one of the first and second tests.

In another aspect of the disclosure, a method is provided that includes operations including receiving a stream of samples, wherein each sample has an associated network delay value that indicates an amount of time data packets associated with the sample are delayed when transmitted between first network device and second network devices coupled to a network. The operations further include defining at least one first group of samples, wherein the number of samples included in each group are defined by a window size, and determining a first network delay characteristic for the respective first groups, wherein each network delay characteristic is based on the network delay values corresponding to the respective samples included in the corresponding group.

The operations further include applying a first test to the first network delay characteristic determined for the respective first groups, adjusting the window size based on a result of the first test associated with the respective first groups, and using the adjusted window size, define at least one second group of samples, each second group including samples of the stream of samples subsequent to the samples included in the at least one first group. The operations further include determining a second network delay characteristic for the respective second groups, applying a second test to the second network delay characteristic determined for the respective second groups, and determining whether to generate an alert notification based on a result of at least one of the first and second tests.

In accordance with a further aspect of the disclosure, a non-transitory computer readable storage medium and one or more computer programs embedded therein are provided. The computer programs include instructions, which when executed by a computer system, cause a computer system to perform operations including receiving a stream of samples, wherein each sample has an associated network delay value that indicates an amount of time data packets associated with the sample are delayed when transmitted between first network device and second network devices coupled to a network. The operations further include defining at least one first group of samples, wherein the number of samples included in each group are defined by a window size, and determining a first network delay characteristic for the respective first groups, wherein each network delay characteristic is based on the network delay values corresponding to the respective samples included in the corresponding group.

The operations further include applying a first test to the first network delay characteristic determined for the respective first groups, adjusting the window size based on a result of the first test associated with the respective first groups, and using the adjusted window size, define at least one second group of samples, each second group including samples of the stream of samples subsequent to the samples included in the at least one first group. The operations further include determining a second network delay characteristic for the respective second groups, applying a second test to the second network delay characteristic determined for the respective second groups, and determining whether to generate an alert notification based on a result of at least one of the first and second tests.

BRIEF DESCRIPTION OF THE DRAWINGS

The accompanying appendices and/or drawings illustrate various non limiting example, inventive aspects in accordance with the present disclosure.

DETAILED DESCRIPTION OF CERTAIN EMBODIMENTS

Figure 1:
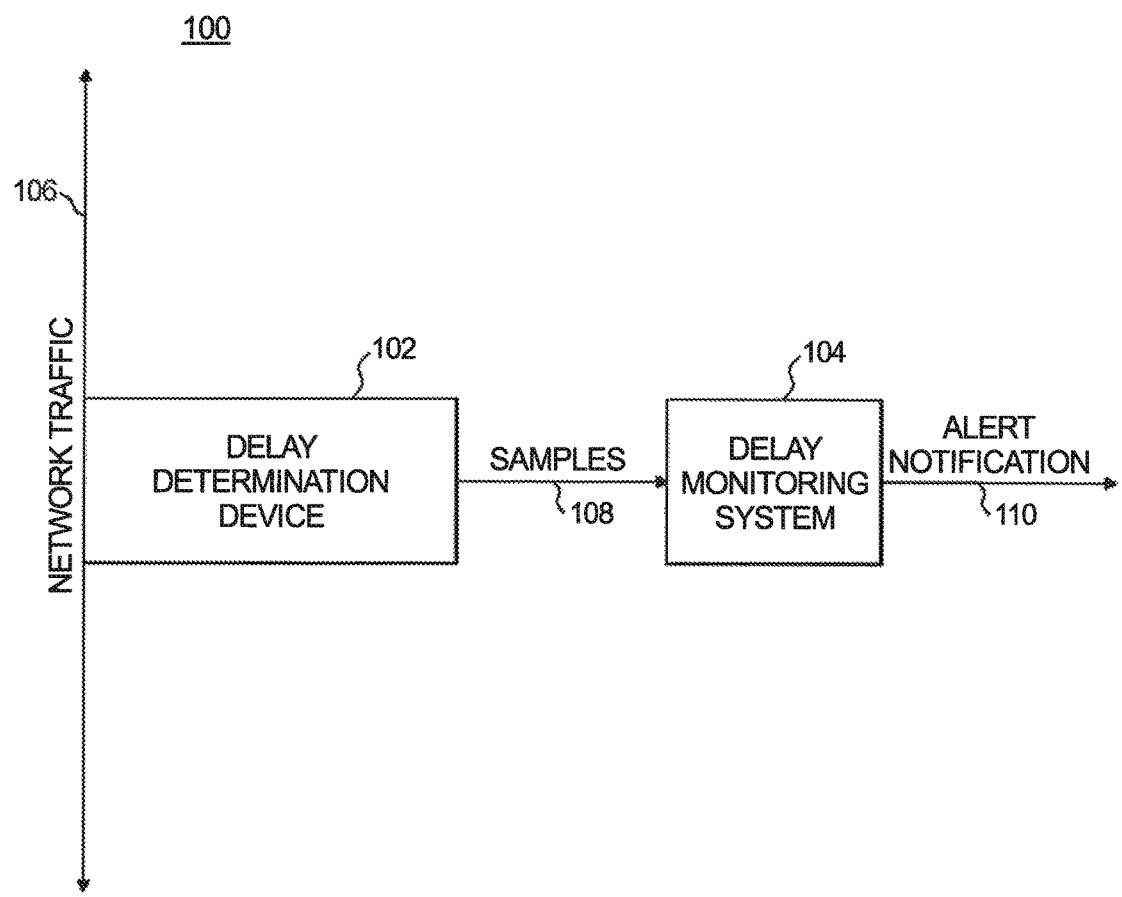
FIG. 1 is a schematic diagram that illustrates an example network monitoring system in accordance with the present disclosure.

Reference will now be made to the drawings wherein like reference numerals identify similar structural features or aspects of the subject disclosure. For purposes of explanation and illustration, and not limitation, a block diagram of an exemplary embodiment of a network monitoring system in accordance with the disclosure is shown in FIG. 1 and is designated generally by reference character 100. Other embodiments of the network monitoring system 100 in accordance with the disclosure, or aspects thereof, are provided in FIGS. 2-6, as will be described. The systems and methods described herein can be used to provide improved network monitoring functions, for example in monitoring user-experience.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network monitoring system 100 includes a delay determination device 102 and a delay monitoring system 104. The delay determination device 102 monitors network traffic propagating along one or more communication links 106 by measuring network delays. The network delay is a delay associated with a communication via a network being monitored from a source node to a destination node (not shown). In embodiments, network delay is the latency between a TCP response message and a corresponding ACK message. In other embodiments, different measurements can be used to measure network delays.

The delay determination device 102 outputs network delay samples that correspond to measurements of network delays. Each sample can be an average of network delays measured on a particular communication link 106 within a predetermined time interval. The predetermined time interval can be, for example and without limitation, one minute.

The network delay samples are provided to the delay monitoring system 104 via communication link 108. The delay determination device 104 monitors the samples included in a group of samples. The number of samples included in each group is defined by a window size.

A function is applied to the network delay associated with the samples in the group, wherein the result provides a network delay characteristic. A test is applied to the network delay characteristic. For example, the function can include determining the average network delay for all of the samples included in the group, and the test can include comparing the network delay characteristic to a predetermined threshold value. In another example, the maximum and minimum network delays can be discarded, and the number of occurrences of network delays within the group that exceed the threshold value can be compared to a number of occurrences of the network delays that are below the threshold value. The disclosure is not limited to a particular function or test.

Figure 2:
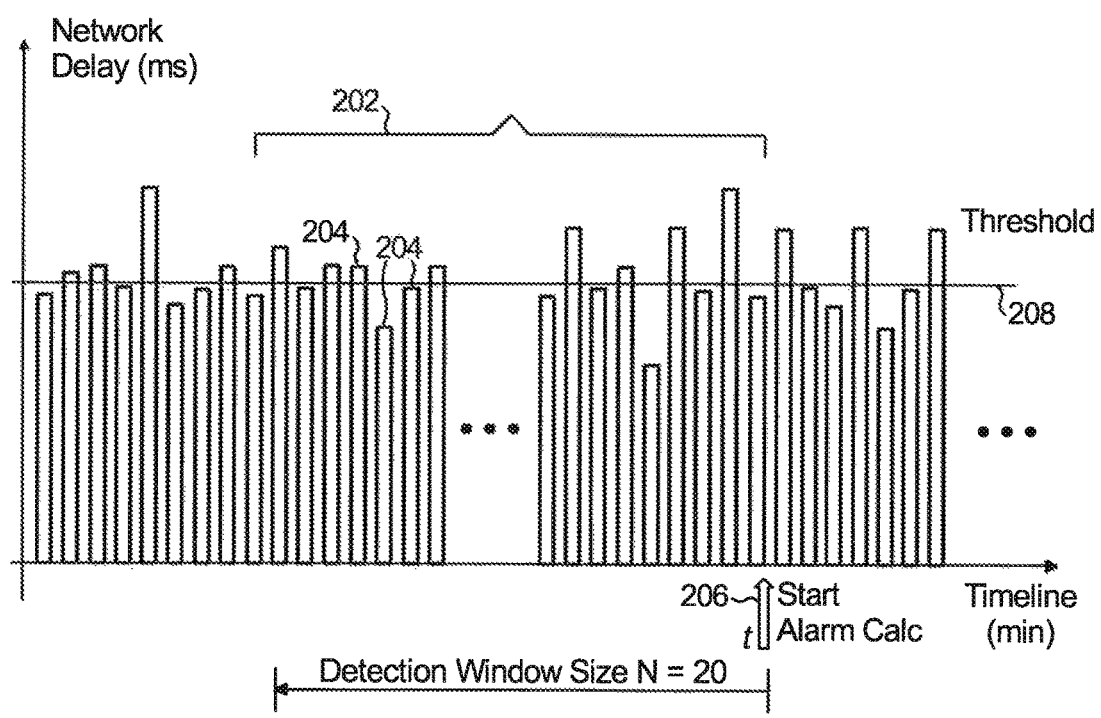
FIG. 2 is a bar diagram that illustrates an example network delay sample in accordance with the present disclosure.

With reference to FIG. 2, a bar diagram is illustrated with an example group 202 that includes N samples 204, wherein N=20. Once 20 samples are acquired, which occurs at time t as indicated by arrow 206, the network delay associated with all of the 20 samples is averaged to provide a network delay characteristic. The average value determined is compared to a threshold value 208. Although many of the samples 204 in the group 202 exceed the threshold value 208, an alert is not generated based on the individual samples 204.

One or more pattern conditions can further be applied to a plurality of groups, such as a series of groups, to determine whether the test result for the plurality of groups forms a predetermined pattern. For example, a first pattern condition may be satisfied when all (or substantially all) of the groups in a series of N groups do not satisfy the test, and a second pattern condition may be satisfied when all (or substantially all) of the groups in a series of M groups do satisfy the test. N and M can be selected to be equal to one another or to be different values. In response to the results of the test and/or the results of the pattern condition, the window size can be adjusted and/or an alert status can be updated.

Figure 3:
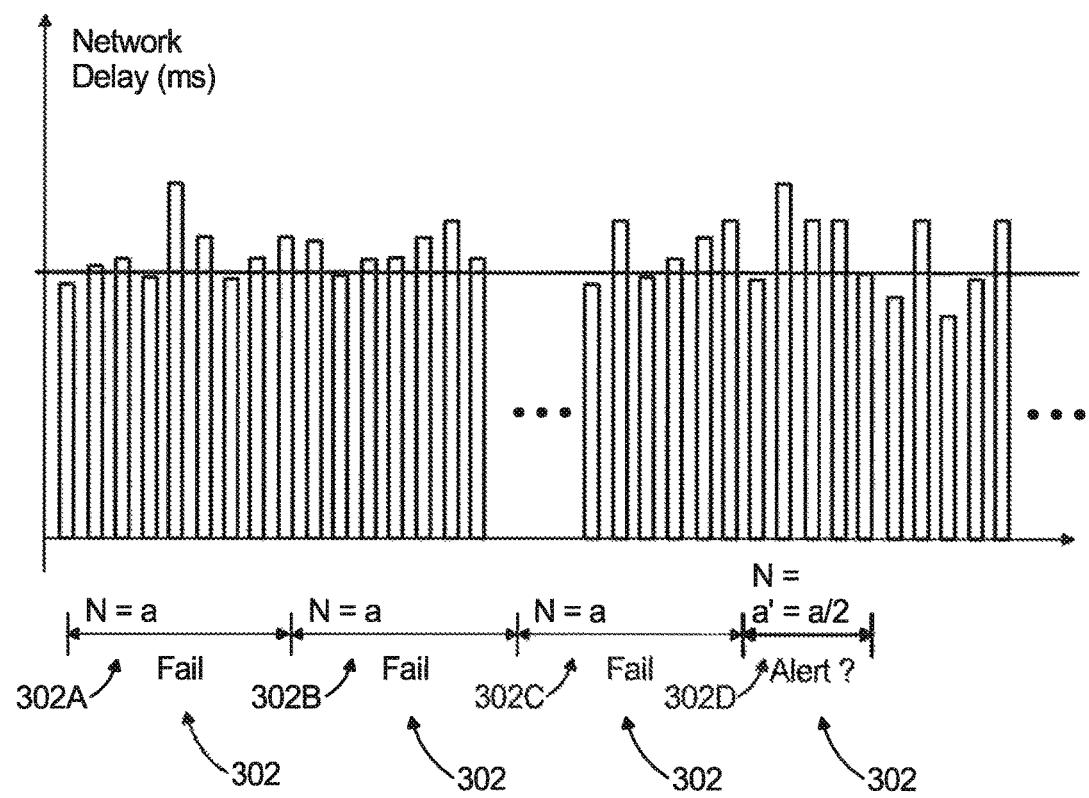
FIG. 3 is a bar diagram that illustrates an example series of network delay samples in accordance with a first scenario.

FIG. 3 illustrates a bar diagram of a series of groups 302, including groups 302A-302D, wherein each group 302 includes "a" samples 304. In the example shown, and without limitation to the particular example, a network delay characteristic is determined for group 302A and a test is performed. The test can determine, for example, whether the network delay characteristic is below a predetermined threshold value. When the test condition is not met, the test result is indicated as "fail." When the test fails for the first group 402A, the alert status can change from an alert status of stable to an alert status of tentative alert, without adjusting the window size.

A determination is made whether a first pattern condition is met, namely whether the test fails for N consecutive groups 302A-302C, where N=3. When the first pattern condition is met, the window size can be adjusted. However, in an embodiment the alert status is not yet updated. As shown, since the test condition failed for groups 302A-302C, the first pattern condition is met, and the window size is adjusted from a to a', without updating the alert status. In the example shown, and without limitation, a'=a/2.

After adjusting the window size of group 302D, if a determination is made whether the test condition fails again for group 302D. If so, the alert status can be changed to alert. When the alert status changes to alert, an alert can be generated to notify a user, e.g., administrator, that an alert condition has been detected. The alert notification can be a visual notification displayed on a graphical user interface (GUI) or that causes an alert indicator, such as an LED indicator, to visually indicate the alert status. In other examples, the alert notification can be an audio or tactile (e.g., vibratory) signal.

However, if the test passed for group 302D, a second pattern condition can be determined. In an example and without limitation, if the second pattern condition is satisfied the alert status can be changed to stable and the window size can return to its original size. In an example, the second pattern condition includes determining that the test passes for M consecutive groups that have an adjusted window size, wherein M=2.

Figure 4:
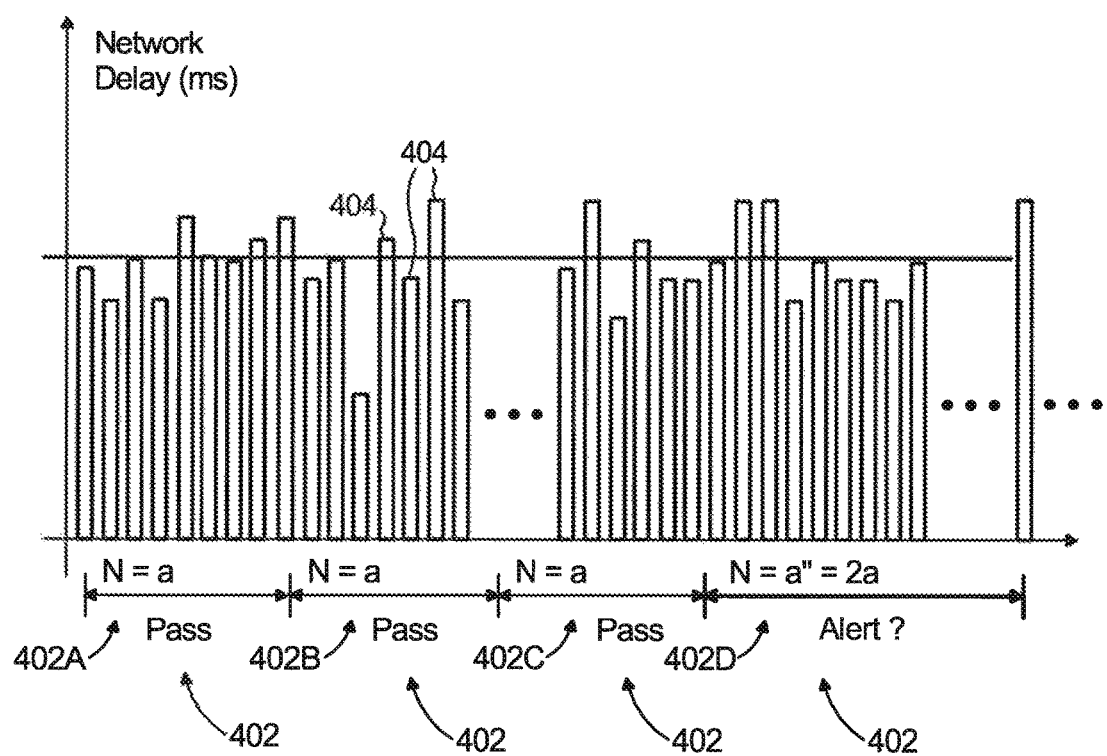
FIG. 4 is a bar diagram that illustrates an example series of network delay samples in accordance with a second scenario.

In another example, FIG. 4 illustrates a bar diagram of a series of groups 402, including groups 402A-402D, wherein each group 402 includes "a" samples 404. In the example shown, and without limitation to the particular example, a network delay characteristic is determined for group 402A and a test is performed. The test can determine, for example, whether the ND characteristic is below a predetermined threshold value. When the test passes, the alert status can change from an alert status of alert or tentative alert to an alert status of tentative stable, without adjusting the window size.

A determination is made whether a third pattern condition is met, namely whether the test passes for N consecutive groups 402A-402C, wherein N=3. When the third pattern condition is met, the window size can be adjusted. As shown, since the test condition passed for groups 402A-402C, the third pattern condition is met, and the window size is adjusted from a to a', without updating the alert status. In the example shown, and without limitation, a'=2a.

After adjusting the window size of group 402D, a determination is made whether the test passes for group 402D. If so, the alert status can be changed to stable. In embodiments, a the alert status may only be changed to stable after a predetermined number of groups having the adjusted window size pass the test.

However, if the test failed for group 402D, a fourth pattern condition can be determined. In an example and without limitation, if the fourth pattern condition is satisfied the alert status can be changed to tentative alert, and the window size can return to its original size. In an example, the fourth pattern condition includes determining that the test failed for N consecutive groups, wherein N=3.

The functions, pattern conditions, values of M, N can be selected to obtain a balance between instantaneity and detection accuracy. When the window size is adjusted to a smaller size instantaneity is high, however detection accuracy can be degraded since the test results are relatively prone to false positives. When the window size is adjusted to a larger size, the detection accuracy can be improved with the occurrence of fewer false positives; however instantaneity is decreased, which can result in a slower reaction an actual degradation in network delay.

Figure 5:
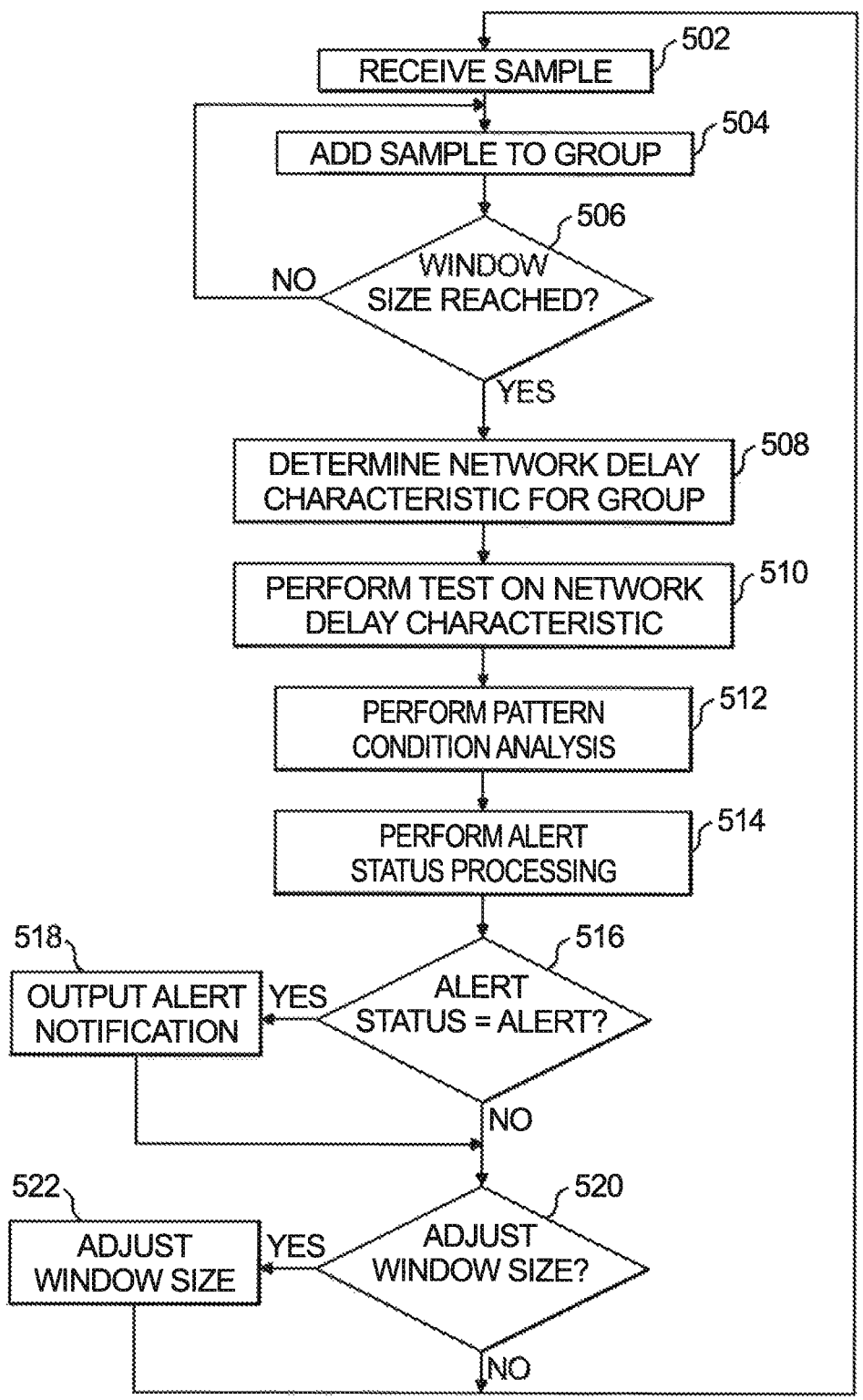
FIG. 5 is a flowchart that illustrates an example method of a delay monitoring system shown in FIG. 1.

With reference now to FIG. 5, shown is a flowchart demonstrating implementation of the various exemplary embodiments. It is noted that the order of operations shown in FIG. 5 is not required, so in principle, the various operations may be performed out of the illustrated order. Also certain operations may be skipped, different operations may be added or substituted, or selected operations or groups of operations may be performed in a separate application following the embodiments described herein.

At operation 502 a network delay sample is received. At operation 504 the sample is added to a current group of samples that is being formed. At operation 506, a determination is made whether the window size of the group has been reached. If the determination at operation 506 is NO, the method continues at operation 504. If the determination at operation 506 is YES, the method continues at operation 508.

At operation 508, a network delay characteristic is determined for the group. The network delay characteristic can be determined, for example, by applying a function to the samples included in the group, such as determining an average network delay value associated with the samples. At operation 510, a test is performed on the network delay characteristic for the group. For example, the test can include comparing the network delay characteristic to a threshold value.

At operation 512, a pattern condition analysis is performed on the group. The pattern condition analysis can included determining if a selected pattern condition is met, wherein the pattern condition can be selected based on results of pattern condition analyses performed during one or more previous iterations. A selected pattern condition can include a series of a predetermined number (e.g., N or M) recent (or consecutive) groups that either did meet or did not meet a test applied during the test performed at operation 510, including during the present iteration and/or previous iterations.

At operation 514 alert status processing is performed based on the results of the test performed at operation 510 and/or the determination at operation 512 whether the pattern condition is met. The alert status processing 514 can be performed using the results of operations 510 and/or 512 as performed during the present iteration and/or during one or more previous iterations. For example, if the window size was reduced during a previous iteration and it was determined during the present iteration that a test was not passed, the alert status may be changed to alert.

At operation 516, a determination is made whether the alert status is alert. If the determination at operation 516 is YES, then at operation 518 an alert notification is output and the method continues at operation 520. If the determination at operation 516 is NO, the method continues at operation 520.

At operation 520 a determination is made whether to adjust the window size. The determination regarding adjustment of the window size at operation 520 can be performed using the results of operations 510 and/or 512 as performed during the present iteration and/or during one or more previous iterations. If the determination at operation 520 is YES, then at operation 522 the window size is adjusted, and the method continues at operation 502. If the determination at operation 520 is NO, the operation continues at operation 502.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the delay monitoring system 104 may be implemented or executed by one or more computer systems. For example, the delay monitoring system 104 can be implemented using a computer system such as example computer system 602 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
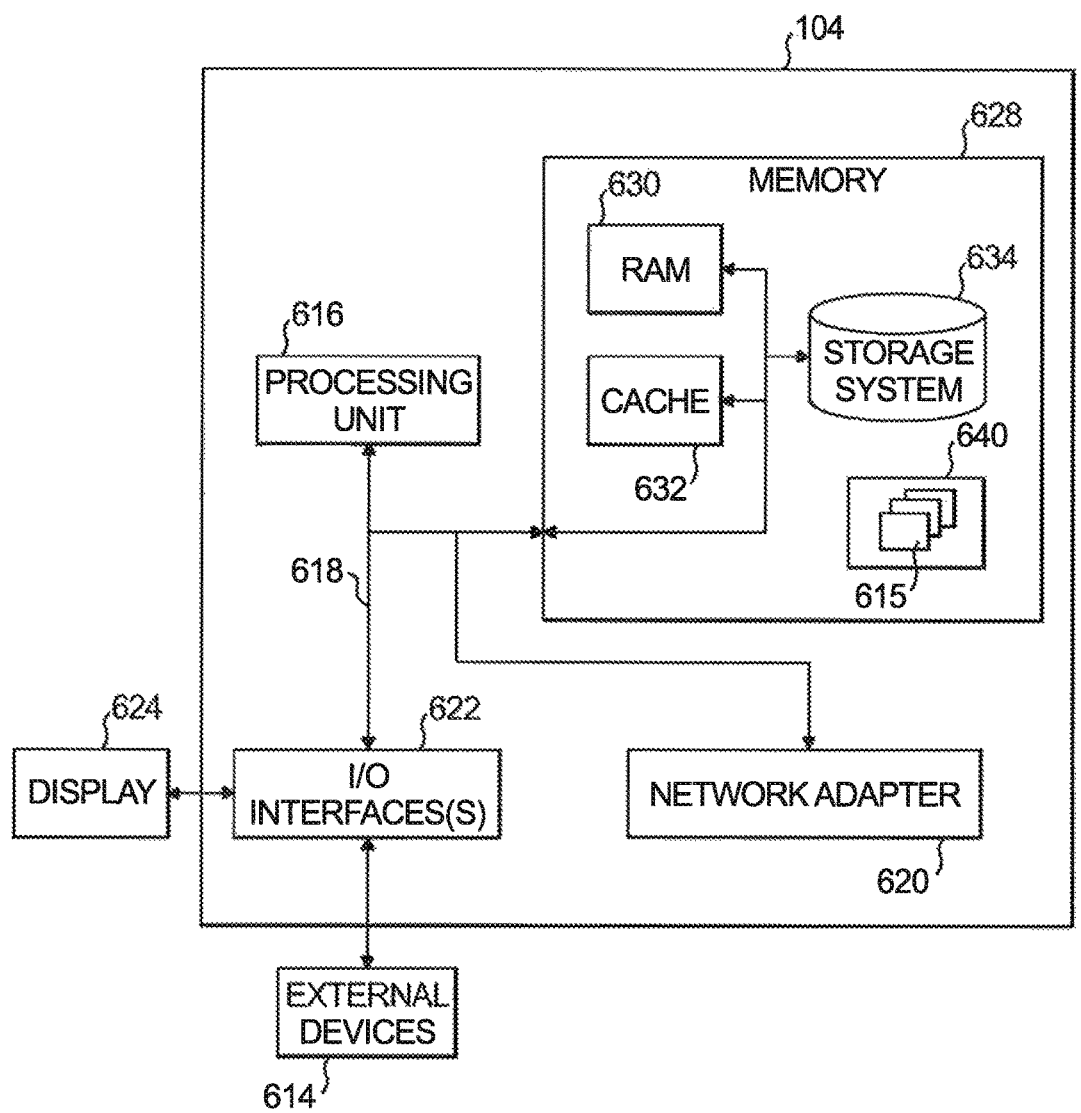
FIG. 6 is a schematic diagram that illustrates internal and external components of an example computing system that implements the delay monitoring system of FIG. 1 in accordance with the present disclosure.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by network management server 104, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as computer system 602, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more devices that enable a user to interact with computer system 602; and/or any devices (e.g., network card, modem, etc.) that enable network management server 104 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of network management server 104 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the packet analysis system 100 include minimizing an amount of network data that is stored in long term storage for analysis related to detected attacks. The network data stored in long term storage is limited to copies of data packets that have been determined to be included in traffic streams having at least one packet associated with a detected attack.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method of monitoring a network comprising operations to:
   A. receive a stream of samples, each sample having an associated network delay value that indicates an amount of time data packets associated with the sample are delayed when transmitted between first network device and second network devices coupled to a network;
   B. define at least one first group of samples that correspond to a network delay measured on a communication link within a certain time interval, the number of samples included in each group being defined by a window size;
   C. determine a first network delay characteristic for the respective first groups, each network delay characteristic being based on the network delay values corresponding to the respective samples included in the corresponding group;
   D. apply a first test to the first network delay characteristic determined for the respective first groups;
   E. adjust the window size based on a result of the first test associated with the respective first groups;
   F. using the adjusted window size, define at least one second group of samples that correspond to a network delay measured on a communication link within a certain time interval, each second group including samples of the stream of samples subsequent to the samples included in the at least one first group;
   G. determine a second network delay characteristic for the respective second groups;
   H. apply a second test to the second network delay characteristic determined for the respective second groups; and
   I. determine whether to generate an alert notification based on a result of at least one of the first and second tests.

2. The method of claim 1, wherein the method further comprises repeating operations E-I, replacing first test associated with the respective first groups with the second test associated with the respective second groups, and defining a new set of at least one second group of samples that include samples of the stream of samples subsequent to the samples included in the at least one second group.

3. The method of claim 1, wherein the determination whether to generate an alert notification is based on the result of the first and second tests.

4. The method of claim 1, wherein the network delay value associated with each sample of the stream of samples is based on a characteristic of data packets transmitted between network devices of the network during an associated time period having a predetermined length.

5. The network monitoring system of claim 1, wherein each network delay characteristic is an average value of the network delay values associated with the samples included in the corresponding group.

6. The network monitoring system of claim 1, wherein the first test includes determining whether the first network delay characteristic associated with the corresponding group is below a predetermined threshold value, and the window size is decreased in response to a negative determination.

7. The network monitoring system of claim 1, wherein the first test includes determining whether the first network delay characteristic associated with the corresponding group is below a predetermined threshold value, and the window size is increased in response to a positive determination.

8. A non-transitory computer readable storage medium and one or more computer programs embedded therein, the computer programs comprising instructions, which when executed by a computer system, cause a computer system to:
   A. receive a stream of samples, each sample having an associated network delay value that indicates an amount of time data packets associated with the sample are delayed when transmitted between first network device and second network devices coupled to a network;
   B. define at least one first group of samples that correspond to a network delay measured on a communication link within a certain time interval, the number of samples included in each group being defined by a window size;
   C. determine a first network delay characteristic for the respective first groups, each network delay characteristic being based on the network delay values corresponding to the respective samples included in the corresponding group;
   D. apply a first test to the first network delay characteristic determined for the respective first groups;
   E. adjust the window size based on a result of the first test associated with the respective first groups;
   F. using the adjusted window size, define at least one second group of samples that correspond to a network delay measured on a communication link within a certain time interval, each second group including samples of the stream of samples subsequent to the samples included in the at least one first group;
   G. determine a second network delay characteristic for the respective second groups;
   H. apply a second test to the second network delay characteristic determined for the respective second groups; and
   I. determine whether to generate an alert notification based on a result of at least one of the first and second tests.

9. The non-transitory computer readable storage medium of claim 8, wherein the instructions, when executed by a computer system, cause a computer system to repeat operations E-I, replacing first test associated with the respective first groups with the second test associated with the respective second groups, and defining a new set of at least one second group of samples that include samples of the stream of samples subsequent to the samples included in the at least one second group.

10. The non-transitory computer readable storage medium of claim 8, wherein the determination whether to generate an alert notification is based on the result of the first and second tests.

11. The non-transitory computer readable storage medium of claim 8, wherein the network delay value associated with each sample of the stream of samples is based on a characteristic of data packets transmitted between network devices of the network during an associated time period having a predetermined length.

12. The non-transitory computer readable storage medium of claim 8, wherein the first test includes determining whether the first network delay characteristic associated with the corresponding group is below a predetermined threshold value, and the window size is decreased in response to a negative determination.

13. The non-transitory computer readable storage medium of claim 8, wherein the first test includes determining whether the first network delay characteristic associated with the corresponding group is below a predetermined threshold value, and the window size is increased in response to a positive determination.

* * * * *